US012278516B2

(12) United States Patent
Zhang et al.

(10) Patent No.: US 12,278,516 B2
(45) Date of Patent: Apr. 15, 2025

(54) CONTROL CIRCUIT FOR RELAY IN UNINTERRUPTIBLE POWER SUPPLY AND CONTROL METHOD AND CONTROL DEVICE FOR THE SAME

(71) Applicant: Vertiv Corporation, Westerville, OH (US)

(72) Inventors: Zhichao Zhang, Guangdong (CN); Wei Xu, Guangdong (CN); Ping Gong, Guangdong (CN); Fan Tan, Guangdong (CN); Weihao Peng, Guangdong (CN)

(73) Assignee: Vertiv Corporation, Westerville, OH (US)

( * ) Notice: Subject to any disclaimer, the term of this patent is extended or adjusted under 35 U.S.C. 154(b) by 11 days.

(21) Appl. No.: 18/333,243

(22) Filed: Jun. 12, 2023

(65) Prior Publication Data

US 2024/0195209 A1 Jun. 13, 2024

(30) Foreign Application Priority Data

Dec. 7, 2022 (CN) ......................... 202211565648.4

(51) Int. Cl.
*H02J 9/06* (2006.01)
*H02J 7/00* (2006.01)
*H02J 7/34* (2006.01)

(52) U.S. Cl.
CPC .............. *H02J 9/06* (2013.01); *H02J 7/0031* (2013.01); *H02J 7/345* (2013.01); *H02J 2207/20* (2020.01)

(58) Field of Classification Search
CPC .... H02J 9/06; H02J 9/061; H02J 9/062; H02J 7/0031; H02J 7/345; H02J 2207/20
See application file for complete search history.

(56) References Cited

U.S. PATENT DOCUMENTS

2019/0381906 A1 12/2019 Giebel et al.
2020/0186038 A1* 6/2020 Jiang ..................... H02J 7/0047
2021/0408808 A1* 12/2021 Zhang ..................... H02J 7/345
2022/0289057 A1 9/2022 Tsuchiya
2022/0340027 A1 10/2022 Pfeilschifter et al.

FOREIGN PATENT DOCUMENTS

CN 104181829 A 12/2014

OTHER PUBLICATIONS

Extended European Search Report regarding Application No. 23174515.9, dated Nov. 16, 2023.

* cited by examiner

*Primary Examiner* — Jeffrey M Shin
(74) *Attorney, Agent, or Firm* — Harness, Dickey & Pierce, P.L.C.

(57) ABSTRACT

Disclosed is a control circuit for a relay in an uninterruptible power supply, comprising a plurality of capacitors comprising at least a first capacitor; and a plurality of relays comprising at least a first relay, a second relay, a third relay and a fourth relay, wherein a first terminal of the first relay is connected to a positive electrode of a battery, a second terminal of the first relay is connected to a first terminal of the first capacitor, a first terminal of the second relay is connected to a negative electrode of the battery, a second terminal of the second relay is connected to a second terminal of the first capacitor, a second terminal of the third relay is connected to the second terminal of the first relay, and a second terminal of the fourth relay is connected to the second terminal of the second relay.

9 Claims, 6 Drawing Sheets

CONTROL CIRCUIT FOR RELAY IN UNINTERRUPTIBLE POWER SUPPLY AND CONTROL METHOD AND CONTROL DEVICE FOR THE SAME

CROSS REFERENCE TO RELATED APPLICATION

This application claims priority to Chinese Patent Application No. 202211565648.4 filed on Dec. 7, 2022 and entitled "CONTROL CIRCUIT FOR RELAY IN UNINTERRUPTIBLE POWER SUPPLY AND CONTROL METHOD AND CONTROL DEVICE FOR THE SAME", the disclosure of which is incorporated herein by reference in its entirety.

FIELD

The present disclosure relates to the technical field of a control circuit, and in particular to a control circuit for a relay in an uninterruptible power supply, and a control method and a control device for the same.

BACKGROUND

With the continuous development of the Internet and the financial industry, secure and reliable operation of an apparatus is becoming important. An uninterruptible power supply (UPS) plays a crucial role in the apparatus as a key power supply.

In the UPS, when the apparatus is disconnected from a mains power supply, a battery supplies power to the apparatus as a standby power supply, and thus secure and reliable operation of a related circuit of the battery is important. In the related art, in a battery power supply circuit in a control circuit for a relay in the uninterruptible power supply, the relay is commonly connected in parallel with a silicon controlled rectifier (SCR) to protect the relay. As shown in FIG. 1 which is a schematic diagram showing a control circuit for a relay in an uninterruptible power supply according to the related art, an SCR1 is connected in parallel with a relay RLY1, and an SCR2 is connected in parallel with a relay RLY2. Although the SCR may be rapidly switched to the relay in this method, a large inrush current is generated to impact on the subsequent circuits, and a circuit for driving the SCR is added, resulting in an increase of the cost. When the apparatus is disconnected from the mains power supply, the battery is required to be switched to a discharge mode. In such case, the SCR1 and the SCR2 are first turned on to make voltages across the relays equal, and then the relays are turned on, and the battery enters the discharge mode. In the above process, a large inrush current is generated to impact on a capacitor C1, which is likely to damage the capacitor or reduce the life of the capacitor. Therefore, it is difficult to save the cost while ensuring the reliable operation of the relay in the related art.

Currently, no effective solution is provided to solve the above problems.

SUMMARY

A control circuit for a relay in an uninterruptible power supply, and a control method and a control device for the same are provided according to embodiments of the present disclosure, to at least solve the technical problem of low reliability of a soft-start circuit of a battery caused by the relay connected in parallel with the silicon controlled rectifier to protect the relay in the related art.

According to an aspect of the embodiments of the present disclosure, provided is a control circuit for a relay in an uninterruptible power supply comprising: a plurality of capacitors comprising at least a first capacitor; and a plurality of relays comprising at least a first relay, a second relay, a third relay and a fourth relay, wherein a first terminal of the first relay is connected to a positive electrode of a battery, a second terminal of the first relay is connected to a first terminal of the first capacitor, a first terminal of the second relay is connected to a negative electrode of the battery, a second terminal of the second relay is connected to a second terminal of the first capacitor, a second terminal of the third relay is connected to the second terminal of the first relay, and a second terminal of the fourth relay is connected to the second terminal of the second relay.

In an embodiment, the control circuit further comprises: a charging and discharging device, wherein the charging and discharging device is formed by a plurality of inductors and a plurality of switching devices; the plurality of inductors comprise at least a first inductor and a second inductor, a first terminal of the first inductor is connected to the first terminal of the first capacitor, and a first terminal of the second inductor is connected to the second terminal of the first capacitor; and the plurality of switching devices comprise at least a first switching device, a second switching device and a third switching device, wherein a first terminal of the first switching device is connected to a positive electrode of a bus capacitor, a second terminal of the first switching device is connected to a first terminal of the second switching device, a first terminal of the second switching device is connected to a second terminal of the first inductor, a second terminal of the second switching device is connected to a second terminal of the second inductor, a first terminal of the third switching device is connected to the second terminal of the second switching device, and a second terminal of the third switching device is connected to a negative electrode of the bus capacitor, wherein the plurality of capacitors further comprise the bus capacitor.

In an embodiment, the control circuit further comprises: a rectifier, wherein a first terminal of the rectifier is connected to the first terminal of the first switching device, and a second terminal of the rectifier is connected to the second terminal of the third switching device; a plurality of resistors, wherein the plurality of resistors comprise at least a first resistor and a second resistor, a first terminal of the first resistor is connected to a positive electrode of a mains power supply through uncontrolled rectification, a second terminal of the first resistor is connected to a first terminal of the third relay, a first terminal of the second resistor is connected to a negative electrode of the mains power supply through the uncontrolled rectification, and a second terminal of the second resistor is connected to a first terminal of the fourth relay; and a plurality of diodes, wherein the plurality of diodes comprise at least a first diode and a second diode, a positive electrode of the first diode is connected to the second terminal of the first relay, a negative electrode of the first diode is connected to the first terminal of the first switching device, a positive electrode of the second diode is connected to the second terminal of the third switching device, and a negative electrode of the second diode is connected to the second terminal of the second relay.

According to another aspect of the embodiments of the present disclosure, provided is a control method for a control circuit for a relay in an uninterruptible power supply, wherein the control method is applied to control the control circuit for the relay in the uninterruptible power supply according to any one of the above embodiments, and comprises: determining whether the control circuit is in a mains power supply mode; charging the battery by a charger based on voltages of the plurality of capacitors, in a case that the control circuit is in the mains power supply mode; and controlling the battery to enter a discharge mode to supply power to the control circuit by the plurality of relays and a discharger, in a case that the control circuit is not in the mains power supply mode.

In an embodiment, the charging the battery by a charger based on voltages of the plurality of capacitors comprises: turning on a rectifier to increase a voltage of a bus capacitor among the plurality of capacitors to a second predetermined voltage, in a case that the voltage of the bus capacitor reaches a first predetermined voltage; and charging the battery by the charger based on a voltage of the battery and a voltage of the first capacitor, in a case that the voltage of the bus capacitor reaches the second predetermined voltage.

In an embodiment, the charging the battery by the charger based on a voltage of the battery and a voltage of the first capacitor, in a case that the voltage of the bus capacitor reaches the second predetermined voltage comprises: controlling the third relay and the fourth relay to be turned off, and increasing the voltage of the first capacitor to the voltage of the battery by the charger, in a case that the voltage of the first capacitor is less than the voltage of the battery; controlling the third relay and the fourth relay to be turned off, and decreasing the voltage of the first capacitor to the voltage of the battery by the discharger after the third relay and the fourth relay are turned off, in a case that the voltage of the first capacitor is greater than the voltage of the battery; and controlling the first relay and the second relay to be turned on, and controlling the bus capacitor to charge the battery by the charger after the first relay and the second relay are turned on, in a case that the voltage of the first capacitor is equal to the voltage of the battery.

In an embodiment, the controlling the battery to enter a discharge mode to supply power to the control circuit by the plurality of relays and a discharger, in a case that the control circuit is not in the mains power supply mode comprises: controlling the battery to enter a cold start mode, and controlling the first relay and the second relay to be turned on, in a case that the control circuit is not in the mains power supply mode; and controlling the third relay and the fourth relay to be turned off after the first relay and the second relay are turned on, and controlling the battery to enter the discharge mode to supply power to the control circuit by turning on the discharger.

According to another aspect of the embodiments of the present disclosure, provided is a control device for a control circuit for a relay in an uninterruptible power supply, wherein the control device is applied to control the control circuit for the relay in the uninterruptible power supply according to any one of the above embodiments, and comprises: a processing unit configured to determine whether the control circuit is in a mains power supply mode; a first control unit configured to charge the battery by a charger based on voltages of the plurality of capacitors, in a case that the control circuit is in the mains power supply mode; and a second control unit configured to control the battery to enter a discharge mode to supply power to the control circuit by the plurality of relays and a discharger, in a case that the control circuit is not in the mains power supply mode.

In an embodiment, the first control unit comprises: a boost sub-unit configured to turn on a rectifier to increase a voltage of a bus capacitor among the plurality of capacitors to a second predetermined voltage, in a case that the voltage of the bus capacitor reaches a first predetermined voltage; and a first control sub-unit configured to charge the battery by the charger based on a voltage of the battery and a voltage of the first capacitor, in a case that the voltage of the bus capacitor reaches the second predetermined voltage.

In an embodiment, the first control sub-unit comprises: a first control module configured to control the third relay and the fourth relay to be turned off, and increase the voltage of the first capacitor to the voltage of the battery by the charger, in a case that the voltage of the first capacitor is less than the voltage of the battery; a second control module configured to control the third relay and the fourth relay to be turned off, and decrease the voltage of the first capacitor to the voltage of the battery by the discharger after the third relay and the fourth relay are turned off, in a case that the voltage of the first capacitor is greater than the voltage of the battery; and a third control module configured to control the first relay and the second relay to be turned on, and control the bus capacitor to charge the battery by the charger after the first relay and the second relay are turned on, in a case that the voltage of the first capacitor is equal to the voltage of the battery.

In an embodiment, the second control unit comprises: a second control sub-unit configured to control the battery to enter a cold start mode, and control the first relay and the second relay to be turned on, in a case that the control circuit is not in the mains power supply mode; and a third control sub-unit configured to control the third relay and the fourth relay to be turned off after the first relay and the second relay are turned on, and control the battery to enter the discharge mode to supply power to the control circuit by turning on the discharger.

According to another aspect of the embodiments of the present disclosure, provided is an electronic apparatus, comprising one or more processors and a memory, wherein the memory is configured to store one or more programs which, when being executed by the one or more processors, causes the one or more processors to implement the control method for the control circuit for the relay in the uninterruptible power supply according to any one of the above embodiments.

According to another aspect of the embodiment of the present disclosure, provided is a computer-readable storage medium storing thereon a computer program which, when being executed, controls an apparatus where the computer-readable storage medium is located to perform the control method for the control circuit for the relay in the uninterruptible power supply according to any one of the above embodiments.

A control circuit for a relay in an uninterruptible power supply is provided according to the present disclosure. The control circuit comprises a plurality of capacitors comprising at least a first capacitor; and a plurality of relays comprising at least a first relay, a second relay, a third relay and a fourth relay, wherein a first terminal of the first relay is connected to a positive electrode of a battery, a second terminal of the first relay is connected to a first terminal of the first capacitor, a first terminal of the second relay is connected to a negative electrode of the battery, a second terminal of the second relay is connected to a second terminal of the first capacitor, a second terminal of the third relay is connected to the second terminal of the first relay, and a second terminal of the fourth relay is connected to the second terminal of the second relay. The present disclosure solves the technical problem of low reliability of a soft-start circuit of a battery caused by a relay connected in parallel with a silicon controlled rectifier to protect the relay in the related art. In the present disclosure, the second terminal of the fourth relay is connected to the second terminal of the second relay, which can avoid the problem that a relay is connected in parallel with a silicon controlled rectifier to increase the cost, and a large inrush current is generated to impact on the circuit to damage components in the circuit, achieving the technical effects of improving the reliability of the control circuit and reducing the cost.

BRIEF DESCRIPTION OF THE DRAWINGS

The drawings described herein are intended to provide a further understanding of the present disclosure and constitute a part of the present disclosure. The illustrative embodiments of the present disclosure and the description thereof are intended to explain the present disclosure, and do not constitute an undue limitation to the present disclosure. In the drawings.

DETAILED DESCRIPTION

The technical solutions in the embodiments of the present disclosure are described clearly and completely in conjunction with the drawings in the embodiments of the present disclosure hereinafter, so that those skilled in the art can understand the technical solutions of the present disclosure better. It is apparent that the described embodiments are only some embodiments of the present disclosure, rather than all embodiments. All other embodiments obtained by those skilled in the art based on the embodiments of the present disclosure without any creative work fall within the protection scope of the present disclosure.

It should be noted that the terms such as "first", "second" and the like in the description, the claims and the drawings of the present disclosure are only used to distinguish similar objects, rather than describe a particular or chronological order. It should be understood that the terms used in such a way may be exchanged as appropriate, such that the embodiments of the present disclosure described herein can be implemented in an order other than the order shown or described herein. Moreover, the terms such as "comprise", "have" or any other variants thereof are intended to be non-exclusive. For example, a process, method, system, product or apparatus including a series of steps or elements comprises not only the expressly listed steps or elements but also other steps or elements that are not enumerated or are inherent for the process, method, system, product or apparatus.

First Embodiment

A control circuit for a relay in an uninterruptible power supply is provided according to an embodiment of the present disclosure.

Figure 1:
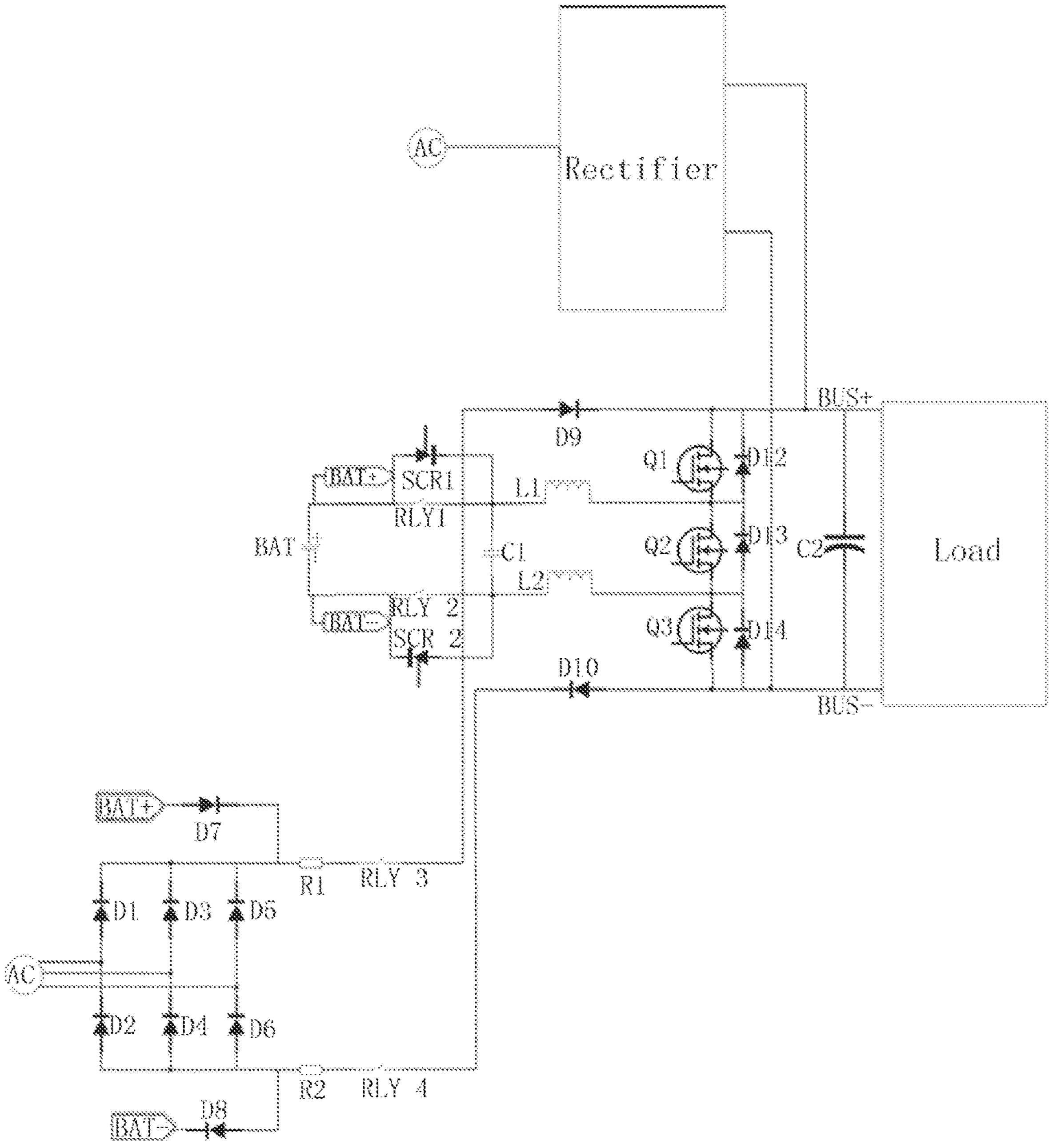
FIG. 1 is a schematic diagram showing a control circuit for a relay in an uninterruptible power supply according to the related art.
Figure 2:
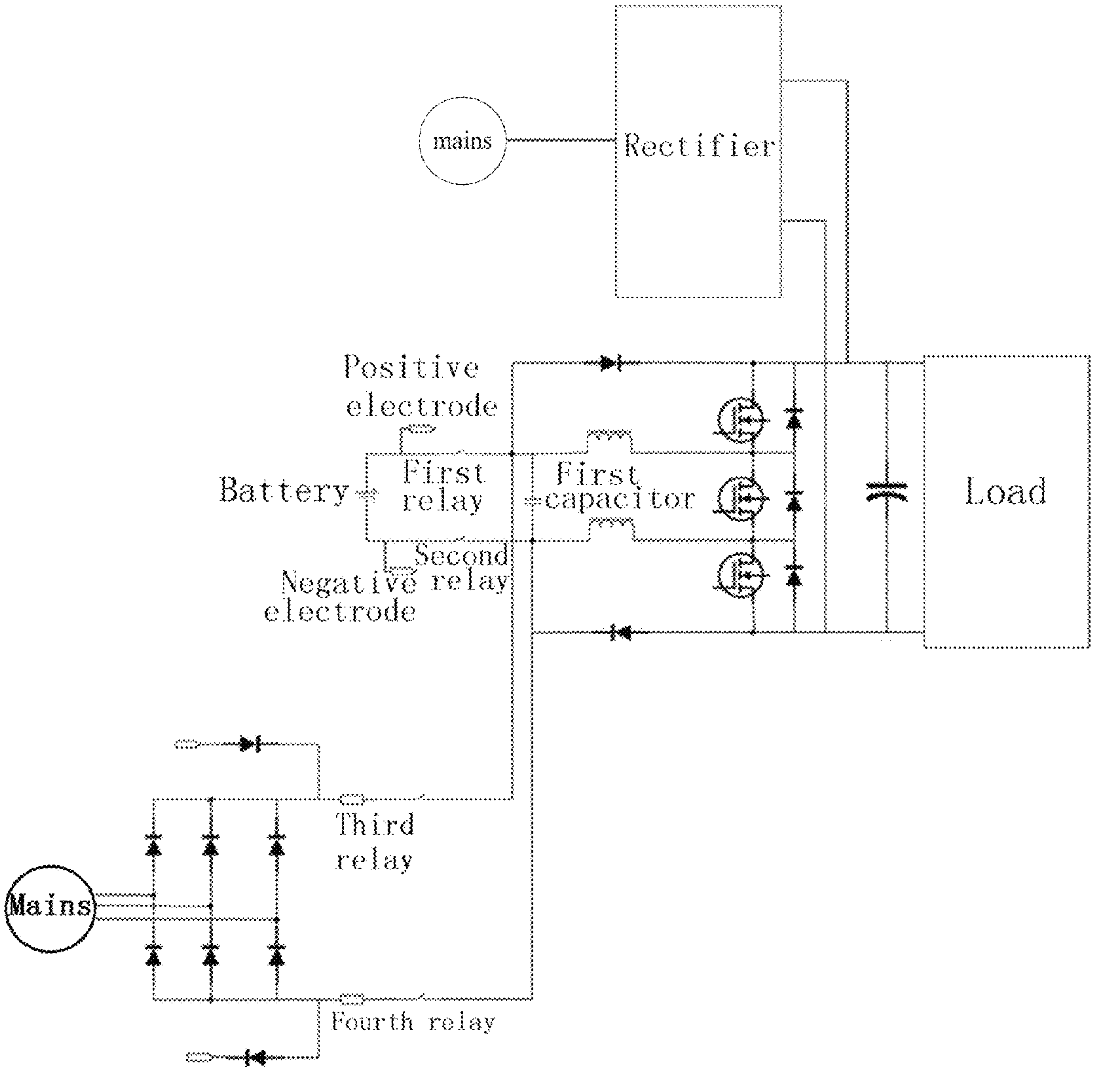
FIG. 2 is a schematic diagram showing a control circuit for a relay in an uninterruptible power supply according to an embodiment of the present disclosure.

FIG. 2 is a schematic diagram showing a control circuit for a relay in an uninterruptible power supply according to an embodiment of the present disclosure. As shown in FIG. 2, the control circuit comprises a plurality of capacitors comprising at least a first capacitor; and a plurality of relays comprising at least a first relay, a second relay, a third relay and a fourth relay, wherein a first terminal of the first relay is connected to a positive electrode of a battery, a second terminal of the first relay is connected to a first terminal of the first capacitor, a first terminal of the second relay is connected to a negative electrode of the battery, a second terminal of the second relay is connected to a second terminal of the first capacitor, a second terminal of the third relay is connected to the second terminal of the first relay, and a second terminal of the fourth relay is connected to the second terminal of the second relay.

Figure 3:
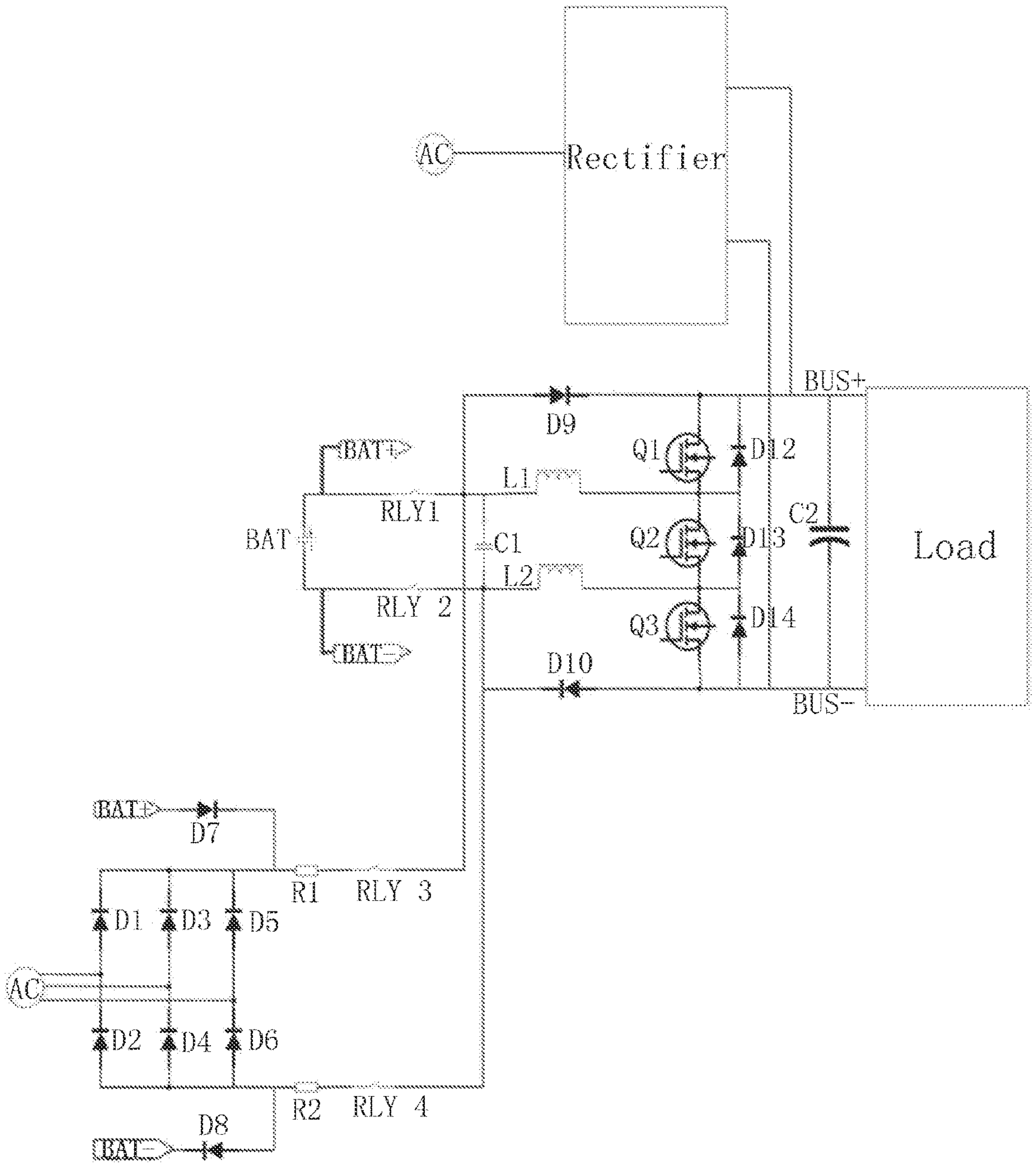
FIG. 3 is a schematic diagram showing a control circuit for a relay in an uninterruptible power supply according to an embodiment of the present disclosure.

FIG. 3 is a schematic diagram showing a control circuit for a relay in an uninterruptible power supply according to an embodiment of the present disclosure. As shown in FIG. 3, the first capacitor among the plurality of capacitors is represented as C1 in FIG. 3, the first relay is represented as RLY1 in FIG. 3, the second relay is represented as RLY2 in FIG. 3, the third relay is represented as RLY3 in FIG. 3, the fourth relay is represented as RLY4 in FIG. 3, and the battery is represented as BAT in FIG. 3. BAT+ represents the positive electrode of the battery and BAT− represents the negative electrode of the battery.

In the embodiment, the second terminal of the fourth relay is connected to the second terminal of the second relay, to avoid the problem that the relay is connected in parallel with the silicon controlled rectifier, and a large inrush current is generated to impact on the first capacitor in the control circuit to damage the first capacitor when the power supply for the control circuit is switched from the mains power supply to the battery.

In an embodiment, the control circuit further comprises: a charging and discharging device, wherein the charging and discharging device is formed by a plurality of inductors and a plurality of switching devices; the plurality of inductors comprise at least a first inductor and a second inductor, a first terminal of the first inductor is connected to the first terminal of the first capacitor, and a first terminal of the second inductor is connected to the second terminal of the first capacitor; and the plurality of switching devices comprise at least a first switching device, a second switching device and a third switching device, wherein a first terminal of the first switching device is connected to a positive electrode of a bus capacitor, a second terminal of the first switching device is connected to a first terminal of the second switching device, a first terminal of the second switching device is connected to a second terminal of the first inductor, a second terminal of the second switching device is connected to a second terminal of the second inductor, a first terminal of the third switching device is connected to the second terminal of the second switching device, and a second terminal of the third switching device is connected to a negative electrode of the bus capacitor, wherein the plurality of capacitors further comprise the bus capacitor.

The switching devices may be implemented by a MOS transistor (a field effect transistor) or an Insulated Gate Bipolar Transistor (IGBT). The plurality of switching devices and the plurality of inductors may form the charging and discharging device. The charging and discharging device may control the control circuit to discharge the first capacitor or charge the battery by controlling the plurality of switching devices to be turned on or off.

As shown in FIG. 3, the bus capacitor among the plurality of capacitors (the bus capacitor is represented as C2 in FIG. 3, BUS+ in FIG. 3 represents the positive electrode of the bus capacitor, and BUS− in FIG. 3 represents the negative electrode of the bus capacitor) may be configured to reduce bus ripple.

It should be noted that the first inductor is represented as L1 in FIG. 3, the second inductor is represented as L2 in FIG. 3, the first switching device is represented as Q1 in FIG. 3, the second switching device is represented as Q2 in FIG. 3, and the third switch device is represented as Q3 in FIG. 3.

The technical effect of ensuring the reliability of a charge-discharge circuit for the battery in the uninterruptible power supply can be achieved by charging or discharging the first capacitor.

In an embodiment, the control circuit further comprises: a rectifier, wherein a first terminal of the rectifier is connected to the first terminal of the first switching device, and a second terminal of the rectifier is connected to the second terminal of the third switching device; a plurality of resistors, wherein the plurality of resistors comprise at least a first resistor and a second resistor, a first terminal of the first resistor is connected to a positive electrode of a mains power supply through uncontrolled rectification, a second terminal of the first resistor is connected to a first terminal of the third relay, a first terminal of the second resistor is connected to a negative electrode of the mains power supply through the uncontrolled rectification, and a second terminal of the second resistor is connected to a first terminal of the fourth relay; and a plurality of diodes, wherein the plurality of diodes comprise at least a first diode and a second diode, a positive electrode of the first diode is connected to the second terminal of the first relay, a negative electrode of the first diode is connected to the first terminal of the first switching device, a positive electrode of the second diode is connected to the second terminal of the third switching device, and a negative electrode of the second diode is connected to the second terminal of the second relay.

The rectifier corresponds to a rectifier shown in FIG. 3. The first diode is represented as D9 in FIG. 3, and the second diode is represented as D10 in FIG. 3. As shown in FIG. 3, the plurality of diodes may further comprise a diode D12, a diode D13, a diode D14, a diode D1, a diode D2, a diode D3, a diode D4, a diode D5, a diode D6, a diode D7, and a diode D8. The first resistor is represented as R1 in FIG. 3, and the second resistor is represented as R2 in FIG. 3. AC in FIG. 3 represents the mains power supply.

The rectifier may convert alternating current into direct current, and the resistors and the charging and discharging device are connected between the third relay, the fourth relay and the mains power supply, so that the technical effect of ensuring stable operation of the control circuit in the uninterruptible power supply can be achieved.

Second Embodiment

A control method for a control circuit for a relay in an uninterruptible power supply is provided according to an embodiment of the present disclosure. The control method is applied to control the control circuit for the relay in the uninterruptible power supply according to any one of the above embodiments.

Figure 4:
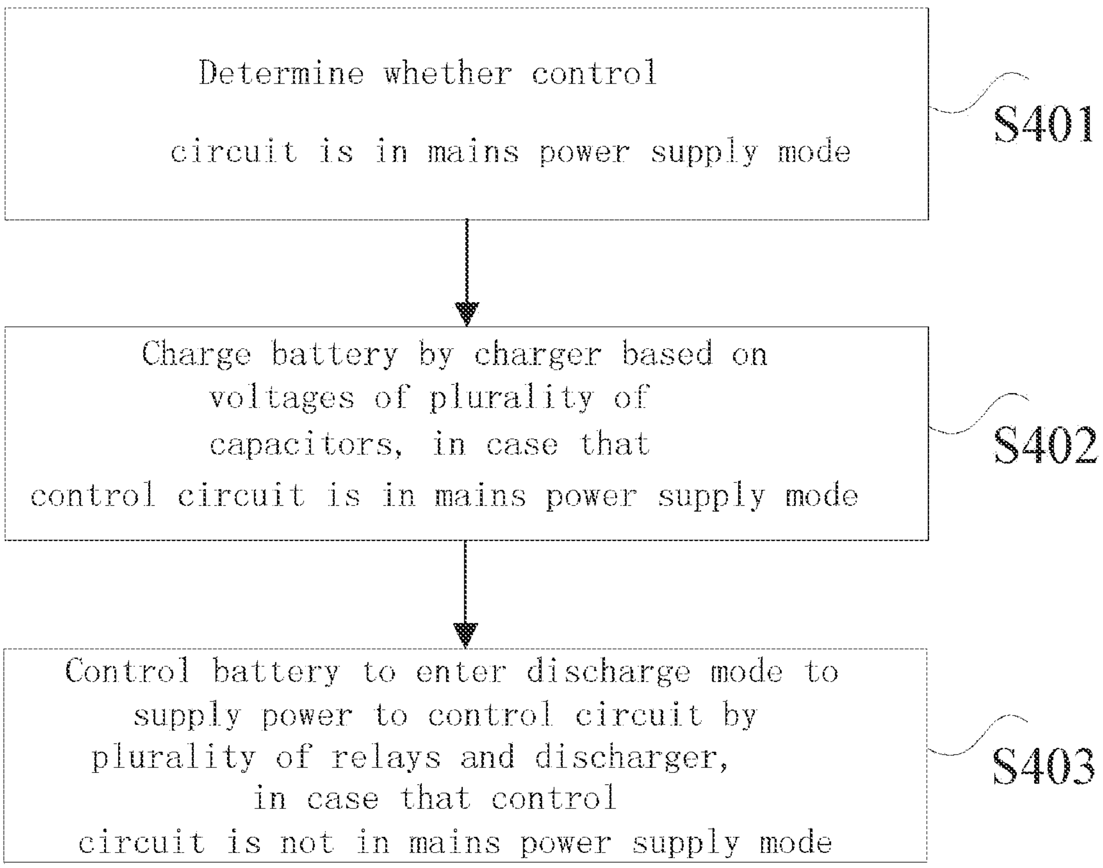
FIG. 4 is a schematic diagram showing a control method for a control circuit for a relay in an uninterruptible power supply according to an embodiment of the present disclosure.

FIG. 4 is a schematic diagram showing a control method a control circuit for a relay in an uninterruptible power supply according to an embodiment of the present disclosure. As shown in FIG. 4, the method comprises the following steps S401 to S403.

Step S401: determining whether the control circuit is in a mains power supply mode.

In the embodiment, in a case that the control circuit is in the mains power supply mode, the relay RLY3 and the relay RLY4 are turned on, and the mains power supply, the diodes D1 to D6, the first resistor R1, the relay RLY3, the capacitor C1, the capacitor C2, the relay RLY4 and the second resistor R2 form a circuit.

Step S402: charging the battery by a charger based on voltages of the plurality of capacitors, in a case that the control circuit is in the mains power supply mode.

In the mains power supply mode, the mains power supply (that is represented as AC in FIG. 3) supplies power to the control circuit in the UPS. In a case that the control circuit is in the mains power supply mode, the bus capacitor is controlled to charge the battery (that is represented as BAT in FIG. 3, where BAT+ represents the positive electrode of the battery and BAT− represents the negative electrode of the battery) by the charger based on a voltage of the first capacitor (that is represented as C1 in FIG. 3) and a voltage of the bus capacitor (that is represented as C2 in FIG. 3).

Step S403: controlling the battery to enter a discharge mode to supply power to the control circuit by the plurality of relays and a discharger, in a case that the control circuit is not in the mains power supply mode.

In a case that the control circuit is not in the mains power supply mode, when the battery is controlled to enter a cold start mode, the battery, the diode D7, the first resistor R1, the third relay RLY3, the first capacitor C1, the fourth relay RLY4, the second resistor R2 and the diode D8 form a circuit to charge the first capacitor C1, so that the voltage Vc1 of the first capacitor is close to a voltage Vbat of the battery. Then the first relay RLY1 and the second relay RLY2 are turned on, the third relay RLY3 and the fourth relay RLY4 are turned off, and the battery is controlled to enter the discharge mode by turning on the discharger, so that the battery supplies power to the control circuit in the UPS.

According to the above steps, the control circuit in the UPS is controlled by the second terminal of the fourth relay being connected to the second terminal of the second relay, so as to avoid the problem that a relay is connected in parallel with a silicon controlled rectifier to increase the cost, and a large inrush current is generated to impact on the circuit to damage components in the circuit, achieving the technical effects of improving the reliability of the control circuit and reducing the cost. The present disclosure solves the technical problem of low reliability of a soft-start circuit of the battery caused by the relay connected in parallel with the silicon controlled rectifier to protect the relay in the related art.

In an embodiment, the charging the battery by a charger based on voltages of the plurality of capacitors comprises: turning on a rectifier to increase a voltage of a bus capacitor among the plurality of capacitors to a second predetermined voltage, in a case that the voltage of the bus capacitor reaches a first predetermined voltage; and charging the battery by the charger based on a voltage of the battery and a voltage of the first capacitor, in a case that the voltage of the bus capacitor reaches the second predetermined voltage.

In the embodiment, in a case that the voltage Vc2 across the bus capacitor C2 (corresponding to the voltage of the bus capacitor described above) reaches the first predetermined voltage Vc2_set, the rectifier is turned on, and the voltage Vbus of the bus capacitor (corresponding to the voltage of the bus capacitor described above) between the positive electrode (that is represented as BUS+ in FIG. 3) of the bus capacitor and the negative electrode (that is represented as BUS− in FIG. 3) of the bus capacitor is charged to a predetermined value Vbus_set (corresponding to the second predetermined voltage described above). The bus capacitor may be controlled to charge the battery by the charger based on the voltage of the battery and the voltage of the first capacitor, so that the technical effect of ensuring stable operation of the control circuit in the uninterruptible power supply can be achieved.

In an embodiment, the charging the battery by the charger based on a voltage of the battery and a voltage of the first capacitor, in a case that the voltage of the bus capacitor reaches the second predetermined voltage comprises: controlling the third relay and the fourth relay to be turned off, and increasing the voltage of the first capacitor to the voltage of the battery by the charger, in a case that the voltage of the first capacitor is less than the voltage of the battery; controlling the third relay and the fourth relay to be turned off, and decreasing the voltage of the first capacitor to the voltage of the battery by the discharger after the third relay and the fourth relay are turned off, in a case that the voltage of the first capacitor is greater than the voltage of the battery; and controlling the first relay and the second relay to be turned on, and controlling the bus capacitor to charge the battery by the charger after the first relay and the second relay are turned on, in a case that the voltage of the first capacitor is equal to the voltage of the battery.

In the embodiment, in a case that the voltage Vc1 across the first capacitor C1 (corresponding to the voltage of the first capacitor described above) through the uncontrolled rectification is greater than the voltage Vbat of the battery, the third relay RLY3 and the fourth relay RLY4 are first turned off, and then the discharger in the charging and discharging device is turned on. When the voltage Vc1 across the first capacitor C1 is decreased to the voltage Vbat of the battery, the discharger is turned off, the first relay RLY1 and the second relay RLY2 are turned on, the charger in the charging and discharging device is turned on, the battery is charged with the voltage of the bus capacitor, and the battery enters a charge mode, to avoid that a large inrush current is generated to impact on the first capacitor, achieving the technical effect of improving the life of the first capacitor.

In a case that the voltage Vc1 across the capacitor C1 through the uncontrolled rectification is less than the voltage Vbat of the battery, the third relay RLY3 and the fourth relay RLY4 are first turned off, the charger in the charging and discharging device is turned on, the first capacitor is charged to make the voltage of the first capacitor equal to the voltage of the battery, and then the first relay RLY1 and the second relay RLY2 are turned on, the charger in the charging and discharging device is turned on, the battery is charged with the voltage of the bus capacitor, and the battery enters the charge mode, achieving the technical effect of ensuring the stability of the UPS system.

It should be noted that in an embodiment, in a case that the discharger in the charging and discharging device is turned on, the second switching device Q2 is turned on, and the first switching device Q1 and the third switching device Q3 are turned off; in a case that the charger in the charging and discharging device is turned on, the first switching device Q1 and the third switching device Q3 are turned on, and the second switching device Q2 is turned off; and in a case that the discharger and the charger are turned off, the first switching device Q1, the second switching device Q2, and the third switching device Q3 are turned off.

In an embodiment, the controlling the battery to enter a discharge mode to supply power to the control circuit by the plurality of relays and a discharger, in a case that the control circuit is not in the mains power supply mode comprises: controlling the battery to enter a cold start mode, and controlling the first relay and the second relay to be turned on, in a case that the control circuit is not in the mains power supply mode; and controlling the third relay and the fourth relay to be turned off after the first relay and the second relay are turned on, and controlling the battery to enter the discharge mode to supply power to the control circuit by turning on the discharger.

In the embodiment, in a case that the control circuit is not in the mains power supply mode, when the battery enters the cold start mode, as shown in FIG. 3, the battery, the diode D7, the first resistor R1, the third relay RLY3, the first capacitor C1, the fourth relay RLY4, the second resistor R2 and the diode D8 form a circuit to charge the first capacitor C1, so that the voltage Vc1 of the first capacitor is close to the voltage Vbat of the battery. Then the first relay RLY1 and the second relay RLY2 are turned on, the third relay RLY3 and the fourth relay RLY4 are turned off, the discharger in the charging and discharging device is turned on, and the battery enters the discharge mode to supply power to the control circuit in the UPS, achieving the technical effect of improving the reliability of the control circuit in the UPS.

Figure 5:
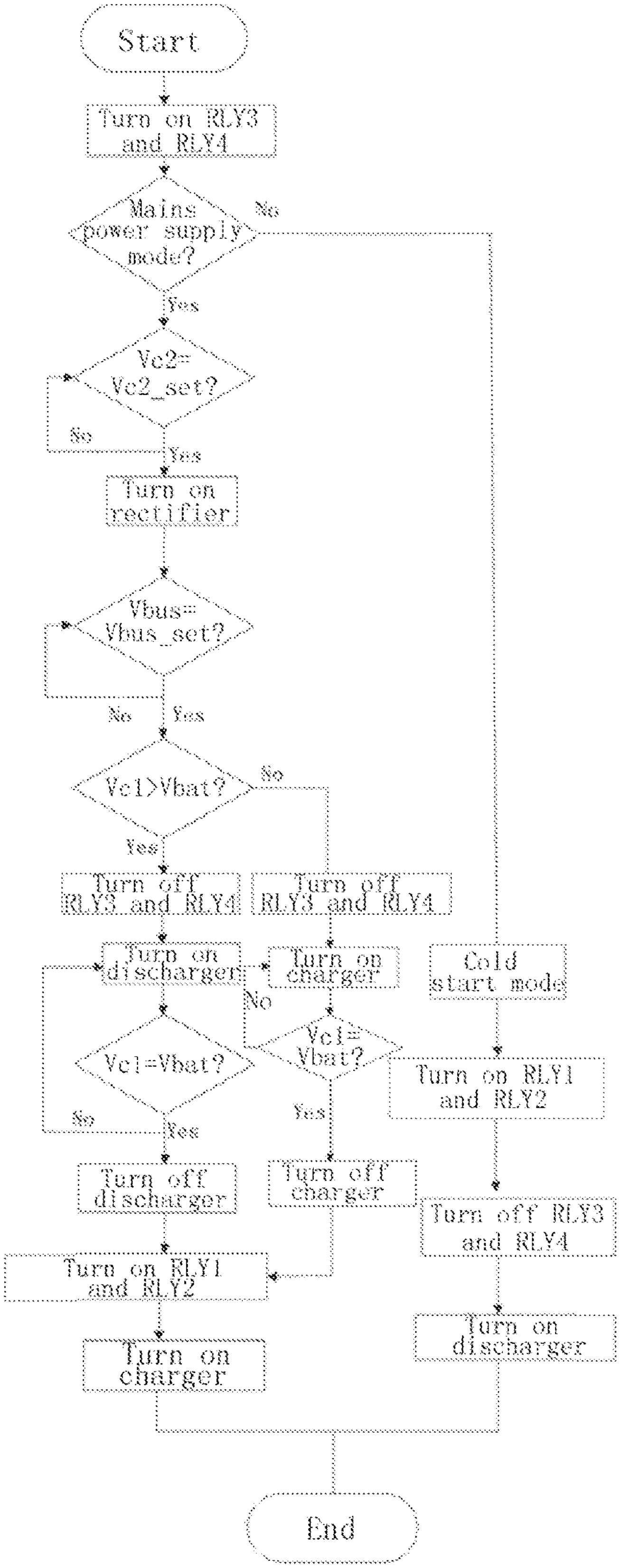
FIG. 5 is a schematic diagram showing a control method for a control circuit for a relay in an uninterruptible power supply according to an embodiment of the present disclosure.

FIG. 5 is a schematic diagram showing a control method for a control circuit for a relay in an uninterruptible power supply according to an embodiment of the present disclosure.

As shown in FIG. 5, in a case that the control circuit is in the mains power supply mode, the relay RLY3 and the relay RLY4 are turned on, and the mains power supply, the diodes D1 to D6, the first resistor R1, the relay RLY3, the capacitor C1, the capacitor C2, the relay RLY4 and the second resistor R2 form a circuit. In a case that the voltage Vc2 across the bus capacitor C2 reaches the voltage Vc2_set, the rectifier is turned on, and the voltage Vbus between the positive electrode BUS+ of the bus capacitor and the negative electrode BUS− of the bus capacitor is charged to the predetermined value Vbus_set. There are the following two cases. In a first case, the voltage Vc1 across the first capacitor C1 through the uncontrolled rectification is greater than the voltage Vbat of the battery. In a second case, the voltage Vc1 across the first capacitor C1 through the uncontrolled rectification is less than the voltage Vbat of the battery.

In the first case, the third relay RLY3 and the fourth relay RLY4 are first turned off, and then the discharger is turned on. When the voltage Vc1 across the first capacitor C1 is decreased to the voltage Vbat of the battery, the discharger is turned off, the first relay RLY1 and the second relay RLY2 are turned on, the charger is turned on, and the battery enters the charge mode.

In the second case, the third relay RLY3 and the fourth relay RLY4 are first turned off, the voltage of the first capacitor is controlled to increase to the voltage of the battery by the charger, then the relay RLY1 and the relay RLY2 are turned on, the charger is turned on, and the battery enters the charge mode.

When the battery enters the cold start mode, the battery, the diode D7, the first resistor R1, the third relay RLY3, the first capacitor C1, the fourth relay RLY4, the second resistor R2 and the diode D8 form a circuit to charge the first capacitor C1, so that the voltage Vc1 of the first capacitor is close to the voltage Vbat of the battery. Then the first relay RLY1 and the second relay RLY2 are turned on, the third relay RLY3 and the fourth relay RLY4 are turned off, the discharger is turned on, and the battery enters the discharge mode.

It should be noted that the steps shown in the flow chart of the drawing may be performed in a computer system such as a set of computer-executable instructions. Although a logical order is shown in the flow chart, in some cases, the shown or described steps may be performed in an order different from the order herein.

Third Embodiment

A control device for a control circuit for a relay in an uninterruptible power supply is provided according to an embodiment of the present disclosure. The control device is applied to control the control circuit for the relay in the uninterruptible power supply according to the first embodiment. Each unit in the control device corresponds to each step in second embodiment.

Figure 6:
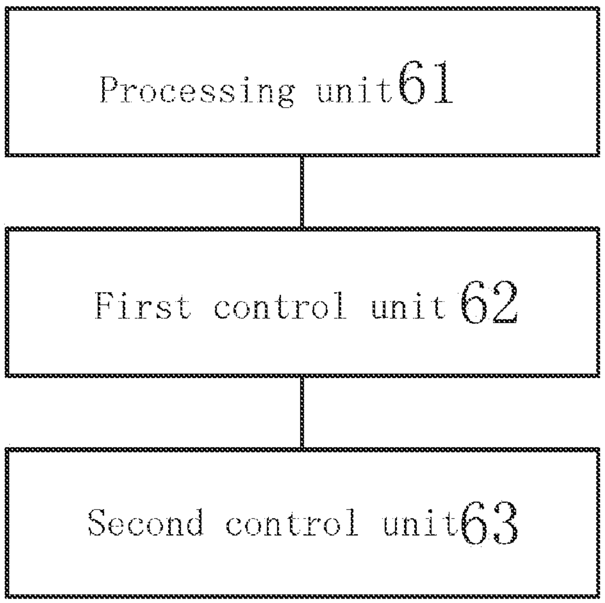
FIG. 6 is a schematic diagram showing a control device for a control circuit for a relay in an uninterruptible power supply according to an embodiment of the present disclosure.

FIG. 6 is a schematic diagram showing a control device for a control circuit for a relay in an uninterruptible power supply according to an embodiment of the present disclosure. As shown in FIG. 6, the control device comprises a processing unit 61, a first control unit 62 and a second control unit 63.

The processing unit 61 is configured to determine whether the control circuit is in the mains power supply mode.

The first control unit 62 is configured to charge the battery by the charger based on voltages of the plurality of capacitors, in a case that the control circuit is in the mains power supply mode.

The second control unit 63 is configured to control the battery to enter the discharge mode to supply power to the control circuit by the plurality of relays and the discharger, in a case that the control circuit is not in the mains power supply mode.

In the control device for the control circuit for the relay in the uninterruptible power supply according to the third embodiment of the present disclosure, the processing unit 61 may determine whether the control circuit is in the mains power supply mode, the first control unit 62 may charge the battery by the charger based on voltages of the plurality of capacitors, in a case that the control circuit is in the mains power supply mode, and the second control unit 63 may control the battery to enter the discharge mode to supply power to the control circuit by the plurality of relays and the discharger, in a case that the control circuit is not in the mains power supply mode, thereby solving the technical problem of low reliability of a soft-start circuit of the battery caused by the relay connected in parallel with the silicon controlled rectifier to protect the relay in the related art. In the present disclosure, the second terminal of the fourth relay is connected to the second terminal of the second relay, which can avoid the problem that a relay is connected in parallel with a silicon controlled rectifier to increase the cost, and a large inrush current is generated to impact on the circuit to damage components in the circuit, achieving the technical effects of improving the reliability of the control circuit and reducing the cost.

In an embodiment, in the control device for the control circuit for the relay in the uninterruptible power supply according to the third embodiment of the present disclosure, the first control unit 62 comprises a boost sub-unit configured to turn on a rectifier to increase a voltage of a bus capacitor among the plurality of capacitors to a second predetermined voltage, in a case that the voltage of the bus capacitor reaches a first predetermined voltage; and a first control sub-unit configured to charge the battery by the charger based on a voltage of the battery and a voltage of the first capacitor, in a case that the voltage of the bus capacitor reaches the second predetermined voltage.

In an embodiment, in the control device for the control circuit for the relay in the uninterruptible power supply according to the third embodiment of the present disclosure, the first control sub-unit comprises: a first control module configured to control the third relay and the fourth relay to be turned off, and increase the voltage of the first capacitor to the voltage of the battery by the charger, in a case that the voltage of the first capacitor is less than the voltage of the battery; a second control module configured to control the third relay and the fourth relay to be turned off, and decrease the voltage of the first capacitor to the voltage of the battery by the discharger after the third relay and the fourth relay are turned off, in a case that the voltage of the first capacitor is greater than the voltage of the battery; and a third control module configured to control the first relay and the second relay to be turned on, and control the bus capacitor to charge the battery by the charger after the first relay and the second relay are turned on, in a case that the voltage of the first capacitor is equal to the voltage of the battery.

In an embodiment, in the control device for the control circuit for the relay in the uninterruptible power supply according to the third embodiment of the present disclosure, the second control unit 63 comprises a second control sub-unit configured to control the battery to enter a cold start mode, and control the first relay and the second relay to be turned on, in a case that the control circuit is not in the mains power supply mode; and a third control sub-unit configured to control the third relay and the fourth relay to be turned off after the first relay and the second relay are turned on, and control the battery to enter the discharge mode to supply power to the control circuit by turning on the discharger.

The control device for the control circuit for the relay in the uninterruptible power supply may further comprise a processor and a memory. The processing unit 61, the first control unit 62, the second control unit 63 and the like are all stored in the memory as program units, and the program units stored in the memory are executed by the processor to achieve corresponding functions.

The processor comprises a core, and the core is configured to call a corresponding program unit from the memory. The number of the core may be one or more. The second terminal of the fourth relay is connected to the second terminal of the second relay by adjusting a parameter of the core, which can avoid the problem that a relay is connected in parallel with a silicon controlled rectifier to increase the cost, and a large inrush current is generated to impact on the circuit to damage components in the circuit, achieving the technical effects of improving the reliability of the control circuit and reducing the cost.

The memory may comprise a non-persistent memory, a random-access memory (RAM), and/or a non-volatile memory among a computer-readable medium, such as a read only memory (ROM) or a flash RAM. The memory comprises at least one memory chip.

An electronic apparatus is further provided according to an embodiment of the present disclosure. The electronic apparatus comprises a processor and a memory. The memory is configured to store executable instructions of the processor. The processor is configured to, when executing the executable instructions, perform the control method for the control circuit for the relay in the uninterruptible power supply according to any one of the embodiments described above.

A computer-readable storage medium is further provided according to an embodiment of the present disclosure. The computer-readable storage medium stores a computer program. The computer program, when being executed, controls an apparatus where the computer-readable storage medium is located to perform the control method for the control circuit for the relay in the uninterruptible power supply according to any one of the embodiments described above.

The sequence numbers of the foregoing embodiments of the present disclosure are merely for the purpose of description, and do not indicate the preference of the embodiments.

In the foregoing embodiments of the present disclosure, the descriptions of the embodiments have respective focuses. For a part not described in detail in an embodiment, reference is made to related description of another embodiment.

In the embodiments of the present disclosure, it should be understood that the disclosed technical contents may be implemented in other manners. The embodiments for the device described above are only schematic. For example, the units may be classified based on logical functions. In actual implementation, the units may be classified in other manners. For example, a plurality of units or components may be combined or integrated into another system, or some features may be omitted or not executed. In addition, the coupling, or direct coupling, or communication connection between the shown or discussed components may be the indirect coupling or communication connection by means of some interfaces, units, or modules, and may be in electrical or other forms.

The units described as separate components may or may not be physically separated. The components shown as units may or may not be physical units, that is, the components may be located in one place, or may be distributed among a plurality of units. Some or all of the units may be selected as needed, to implement the technical solutions of the embodiments.

In addition, each functional unit in each embodiment of the present disclosure may be integrated in a processing unit or each unit may exist physically and separately, or two or more units may be integrated in a processing unit. The integrated unit described above may be implemented by hardware or software functional units.

When the integrated unit is implemented in the form of a software functional unit and sold or used as an independent product, the integrated unit may be stored in a computer-readable storage medium. Based on such understandings, the technical solutions of the present disclosure or a part of the technical solutions that makes contributions to the related art or all or a part of the technical solutions may be essentially embodied in the form of a software product. The computer software product is stored in a storage medium. The computer software product comprises a number of instructions that allow a computer device (which may be a personal computer, a server, a network device, or the like) to execute all or a part of the steps of the method in the embodiments of the present disclosure. The storage medium may comprise various media such as a U disk, a read-only memory (ROM), a random access memory (RAM), a removable hard disk, a magnetic disk, an optical disk or the like which can store program codes.

The foregoing embodiments are only preferred embodiments of the present disclosure. It should be noted that those skilled in the art may further make some improvements and modifications without departing from the principles of the present disclosure, and these improvements and modifications should also fall within the protection scope of the present disclosure.

The invention claimed is:

1. A control circuit for a relay in an uninterruptible power supply, comprising:

a plurality of capacitors comprising at least a first capacitor; and a plurality of relays comprising at least a first relay, a second relay, a third relay and a fourth relay, wherein a first terminal of the first relay is connected to a positive electrode of a battery, a second terminal of the first relay is connected to a first terminal of the first capacitor, a first terminal of the second relay is connected to a negative electrode of the battery, a second terminal of the second relay is connected to a second terminal of the first capacitor, a second terminal of the third relay is connected to the second terminal of the first relay, and a second terminal of the fourth relay is connected to the second terminal of the second relay, wherein the control circuit further comprises a charging and discharging device formed by a plurality of inductors and a plurality of switching devices, wherein the plurality of inductors comprise at least a first inductor and a second inductor, a first terminal of the first inductor is connected to the first terminal of the first capacitor, and a first terminal of the second inductor is connected to the second terminal of the first capacitor, and wherein the plurality of switching devices comprise at least a first switching device, a second switching device and a third switching device, wherein a first terminal of the first switching device is connected to a positive electrode of a bus capacitor, a second terminal of the first switching device is connected to a first terminal of the second switching device, a first terminal of the second switching device is connected to a second terminal of the first inductor, a second terminal of the second switching device is connected to a second terminal of the second inductor, a first terminal of the third switching device is connected to the second terminal of the second switching device, and a second terminal of the third switching device is connected to a negative electrode of the bus capacitor, wherein the plurality of capacitors further comprise the bus capacitor.

2. The control circuit according to claim 1, further comprising:

a rectifier, wherein a first terminal of the rectifier is connected to the first terminal of the first switching device, and a second terminal of the rectifier is connected to the second terminal of the third switching device;

a plurality of resistors, wherein the plurality of resistors comprise at least a first resistor and a second resistor, a first terminal of the first resistor is connected to a positive electrode of a mains power supply through uncontrolled rectification, a second terminal of the first resistor is connected to a first terminal of the third relay, a first terminal of the second resistor is connected to a negative electrode of the mains power supply through the uncontrolled rectification, and a second terminal of the second resistor is connected to a first terminal of the fourth relay; and a plurality of diodes, wherein the plurality of diodes comprise at least a first diode and a second diode, a positive electrode of the first diode is connected to the second terminal of the first relay, a negative electrode of the first diode is connected to the first terminal of the first switching device, a positive electrode of the second diode is connected to the second terminal of the third switching device, and a negative electrode of the second diode is connected to the second terminal of the second relay.

3. A control method for a control circuit for a relay in an uninterruptible power supply, wherein the control method is applied to control the control circuit for the relay in the uninterruptible power supply according to claim 1, and comprises:

determining whether the control circuit is in a mains power supply mode;

charging the battery by a charger based on voltages of the plurality of capacitors, in a case that the control circuit is in the mains power supply mode; and controlling the battery to enter a discharge mode to supply power to the control circuit by the plurality of relays and a discharger, in a case that the control circuit is not in the mains power supply mode.

4. The control method according to claim 3, wherein the charging the battery by a charger based on voltages of the plurality of capacitors comprises:

turning on a rectifier to increase a voltage of a bus capacitor among the plurality of capacitors to a second predetermined voltage, in a case that the voltage of the bus capacitor reaches a first predetermined voltage; and charging the battery by the charger based on a voltage of the battery and a voltage of the first capacitor, in a case that the voltage of the bus capacitor reaches the second predetermined voltage.

5. The control method according to claim 4, wherein the charging the battery by the charger based on a voltage of the battery and a voltage of the first capacitor, in a case that the voltage of the bus capacitor reaches the second predetermined voltage comprises:

controlling the third relay and the fourth relay to be turned off, and increasing the voltage of the first capacitor to the voltage of the battery by the charger, in a case that the voltage of the first capacitor is less than the voltage of the battery;

controlling the third relay and the fourth relay to be turned off, and decreasing the voltage of the first capacitor to the voltage of the battery by the discharger after the third relay and the fourth relay are turned off, in a case that the voltage of the first capacitor is greater than the voltage of the battery; and controlling the first relay and the second relay to be turned on, and controlling the bus capacitor to charge the battery by the charger after the first relay and the second relay are turned on, in a case that the voltage of the first capacitor is equal to the voltage of the battery.

6. The control method according to claim 3, wherein the controlling the battery to enter a discharge mode to supply power to the control circuit by the plurality of relays and a discharger, in a case that the control circuit is not in the mains power supply mode comprises:

controlling the battery to enter a cold start mode, and controlling the first relay and the second relay to be turned on, in a case that the control circuit is not in the mains power supply mode; and controlling the third relay and the fourth relay to be turned off after the first relay and the second relay are turned on, and controlling the battery to enter the discharge mode to supply power to the control circuit by turning on the discharger.

7. A control device for a control circuit for a relay in an uninterruptible power supply, wherein the control device is applied to control the control circuit for the relay in the uninterruptible power supply according to claim 1, and comprises:

a processing unit configured to determine whether the control circuit is in a mains power supply mode;

a first control unit configured to charge the battery by a charger based on voltages of the plurality of capacitors, in a case that the control circuit is in the mains power supply mode; and a second control unit configured to control the battery to enter a discharge mode to supply power to the control circuit by the plurality of relays and a discharger, in a case that the control circuit is not in the mains power supply mode.

8. A computer-readable storage medium storing thereon a computer program which, when being executed, controls an apparatus where the computer-readable storage medium is located to perform the control method for the control circuit for the relay in the uninterruptible power supply according to claim 3.

9. An electronic apparatus, comprising one or more processors and a memory, wherein the memory is configured to store one or more programs which, when being executed by the one or more processors, causes the one or more processors to implement the control method for the control circuit for the relay in the uninterruptible power supply according to claim 3.

* * * * *